US012658115B2

(12) United States Patent
Son et al.

(10) Patent No.: US 12,658,115 B2
(45) Date of Patent: Jun. 16, 2026

(54) DISPLAY DEVICE INCLUDING ABNORMAL PIXELS AND OPERATION METHOD THEREOF

(71) Applicant: Samsung Electronics Co., Ltd., Suwon-si (KR)

(72) Inventors: Taeyong Son, Suwon-si (KR); Jungmin Ku, Suwon-si (KR); Sunghwan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/975,664

(22) Filed: Dec. 10, 2024

(65) Prior Publication Data

US 2025/0104617 A1 Mar. 27, 2025

Related U.S. Application Data

(63) Continuation of application No. PCT/KR2023/011521, filed on Aug. 4, 2023.

(30) Foreign Application Priority Data

Sep. 30, 2022 (KR) ........................ 10-2022-0125213

(51) Int. Cl.
*G09G 3/30* (2006.01)
*G09G 3/32* (2016.01)

(52) U.S. Cl.
CPC ....... *G09G 3/32* (2013.01); *G09G 2320/0242* (2013.01); *G09G 2320/064* (2013.01); *G09G 2330/10* (2013.01)

(58) Field of Classification Search
CPC ........... G09G 3/30–32; G09G 2320/02; G09G 2320/0233; G09G 2320/0242; G09G 2320/064; G09G 2330/10
See application file for complete search history.

(56) References Cited

U.S. PATENT DOCUMENTS 10,128,308 B1 11/2018 Shin et al.
10,943,544 B2 3/2021 Lee et al.
(Continued)

FOREIGN PATENT DOCUMENTS

CN 114049861 A 2/2022
JP 2007200023 A 8/2007
(Continued)

OTHER PUBLICATIONS

International Search Report for PCT/KR2023/011521 mailed Nov. 22, 2023, 3 pages.

(Continued)

*Primary Examiner* — Sanghyuk Park
(74) *Attorney, Agent, or Firm* — Nixon & Vanderhye, P.C.

(57) ABSTRACT

A display device is disclosed. The display device includes: a plurality of light-emitting elements including light emitting circuitry comprising a plurality of subpixels of a display panel, a light emitting diode (LED) driving circuit configured to drive the plurality of light emitting elements, a substrate on which the plurality of light emitting elements and the LED driving circuit are disposed, memory storing an abnormal pixel area and LED arrangement information of the abnormal pixel area, and at least one processor, comprising processing circuitry, individually and/or collectively, configured to control the LED driving circuit such that a signal corresponding to gradation information corresponding to each of the plurality of light emitting elements is provided based on specified LED color positions, wherein at least one processor, individually and/or collectively, is configured to control the LED driving circuit such that a signal corresponding to the LED arrangement information of the abnormal pixel area is provided instead of the specified LED (Continued)

color positions, with respect to the plurality of light-emitting devices in the abnormal pixel area.

15 Claims, 9 Drawing Sheets

(56) References Cited

U.S. PATENT DOCUMENTS

| | | | | |
|---|---|---|---|---|
| 11,481,175 | B2 | 10/2022 | Oh et al. | |
| 11,610,521 | B2 | 3/2023 | Kim et al. | |
| 2007/0109327 | A1* | 5/2007 | Cok | G09G 3/2003 345/690 |
| 2022/0270545 | A1 | 8/2022 | Chaji | |
| 2024/0105126 | A1* | 3/2024 | Kim | G09G 3/006 |

FOREIGN PATENT DOCUMENTS

| | | | |
|---|---|---|---|
| JP | 6945931 | B2 | 9/2021 |
| KR | 20140120819 | A | 10/2014 |
| KR | 101524726 | B1 | 6/2015 |
| KR | 20160040394 | A | 4/2016 |
| KR | 20180026028 | A | 3/2018 |
| KR | 20190045780 | A | 5/2019 |
| KR | 20190074847 | A | 6/2019 |
| KR | 10-2019-0079141 | A | 7/2019 |
| KR | 20190078945 | A | 7/2019 |
| KR | 20200012289 | A | 2/2020 |
| KR | 102305180 | B1 | 9/2021 |
| KR | 20220011377 | A | 1/2022 |
| KR | 20220028524 | A | 3/2022 |
| KR | 20220045520 | A | 4/2022 |
| KR | 102401089 | B1 | 5/2022 |
| KR | 20220152558 | A | 11/2022 |

OTHER PUBLICATIONS

Written Opinion of the ISA for PCT/KR2023/011521 mailed Nov. 22, 2023, 4 pages.

Office Action dated Feb. 5, 2026 in Korean Patent Application No. 10-2022-0125213 with English translation.

* cited by examiner

DISPLAY DEVICE INCLUDING ABNORMAL PIXELS AND OPERATION METHOD THEREOF

CROSS-REFERENCE TO RELATED APPLICATIONS

This application is a continuation of International Application No. PCT/KR2023/011521 designating the United States, filed on Aug. 4, 2023, in the Korean Intellectual Property Receiving Office and claiming priority to Korean Patent Application No. 10-2022-0125213, filed on Sep. 30, 2022, in the Korean Intellectual Property Office, the disclosures of each of which are incorporated by reference herein in their entireties.

BACKGROUND

Field

The disclosure relates to a display device and an operation method and for example, to a display device capable of displaying an image even in the case that an arrangement order of light emitting elements of a specific pixel is different from an arrangement order of light emitting elements of the other pixels, and an operation method.

Description of Related Art

As a method of adjusting gradation of a light emitting element within the conventional display panel, a Pulse Amplitude Modulation (PAM) method and/or a Pulse Width Modulation (PWM) method have been used, wherein the PAM method expresses gradation with a difference of a voltage applied to the light emitting element and the PWM method expresses gradation with a difference of time when a voltage is applied to the light emitting element.

For example, if a plurality of light emitting elements configured of a plurality of rows are driven in a PWM method, it is possible to input PWM data into a plurality of LED driving circuits corresponding to each of the plurality of light emitting elements and drive the plurality of light emitting elements based on the inputted PWM data.

SUMMARY

According to an example embodiment of the disclosure, a display device includes: a plurality of light emitting elements including light emitting circuitry comprising a plurality of subpixels of a display panel, a light emitting diode (LED) driving circuit driving the plurality of light emitting elements, a substrate on which the plurality of light emitting elements and the LED driving circuit are arranged, memory storing an abnormal pixel area and LED arrangement information of the abnormal pixel area, and at least one processor, comprising processing circuitry, individually and/or collectively, configured to control the LED driving circuit to provide a signal corresponding to gradation information corresponding to each of the plurality of light emitting elements based on a specified LED color position.

At least one processor, individually and/or collectively, may be configured to control the LED driving circuit to provide a signal corresponding to the LED arrangement information of the abnormal pixel area instead of the specified LED color position with respect to the plurality of light emitting elements within the abnormal pixel area.

According to an example embodiment of the disclosure, a method of operating a display device including a plurality of light emitting elements including light emitting circuitry comprising a plurality of subpixels includes: storing an abnormal pixel area and light emitting diode (LED) arrangement information of the abnormal pixel area, generating a pulse-width modulation (PWM) signal for driving the plurality of light emitting elements, and driving the plurality of light emitting elements using the generated PWM signal.

The generating the PWM signal includes generating a PWM signal corresponding to the LED arrangement information of the abnormal pixel area instead of the specified LED color position with respect to the plurality of light emitting elements within the abnormal pixel area.

BRIEF DESCRIPTION OF THE DRAWINGS

The aforementioned aspect or the other aspects, features, advantages of certain embodiments of the present disclosure may be more apparent from the following detailed description, taken in conjunction with the accompanying drawings, in which.

DETAILED DESCRIPTION

In case it is determined that in describing the disclosure, the detailed description of related known technologies may unnecessarily confuse the gist of the disclosure, the detailed description may be omitted. Also, the repetitive description of the same configuration may not be provided as much as possible.

In the description below, the suffix "part" regarding the used component is merely given or used together for ease of description, wherein the term itself does not have a distinguished meaning or role.

The terms used in the disclosure is used for describing an example, and it is not intended to restrict and/or limit the disclosure. A singular expression includes a plural expression, unless clearly differently defined in the context.

In the disclosure, the term such as 'include' or 'have' should be construed as designating that there are such characteristics, numbers, steps, operations, components, parts, or a combination thereof described in the disclosure but not as excluding in advance possibility of the existence or addition of one or more other characteristics, numbers, steps, operations, components, parts, or a combination thereof.

The expression "1st", "2nd", "first," "second" or the like used in the disclosure may describe various elements regardless of any order and/or degree of importance, wherein such expressions are used only to distinguish one element from another element and are not intended to limit the elements.

In the description, where one element (e.g. a first element) is "(operatively or communicatively) coupled with/to" or "connected to" another element (e.g. a second element) should be interpreted such that the one element is directly coupled to the another element or the one element is coupled to the another element through the other element (e.g. a third element). In contrast, the description that one element (e.g. a first element) is "directly coupled" or "directly connected" to another element (e.g. a second element) may be interpreted to indicate that the other element (e.g. a third element) is not present between the one element and the another element.

The terms used in the disclosure may be interpreted as meanings generally known to those skilled in the art unless defined otherwise.

Hereinafter, various example embodiments of the disclosure are more specifically described with reference to the appended drawings.

Figure 1:
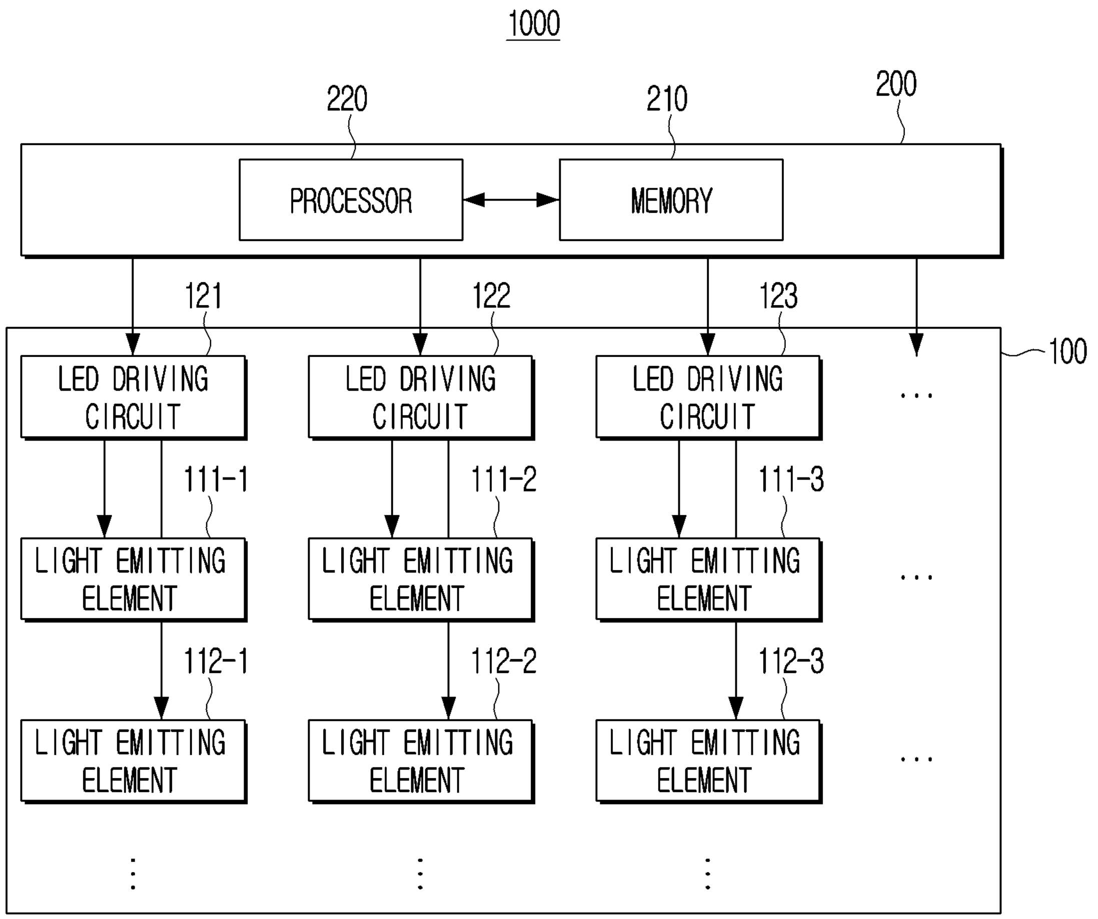
FIG. 1 is a block diagram illustrating an example configuration of a display device according to various embodiments.

FIG. 1 is a block diagram illustrating an example configuration of a display device according to various embodiments.

A display device 1000 may be a terminal device such as a TV, a monitor, a smart phone PC, a laptop PC, a tablet PC, and a desktop PC or a wearable device such as a smart watch, or the like but is not limited thereto, wherein any device that displays an image using a plurality of light emitting elements may be the display device according to the disclosure.

With reference to FIG. 1, the display device 1000 may include a substrate 100 and a driving part 200.

On the substrate 100, a plurality of light emitting elements 111-1, 111-2, 111-3, . . . , 112-1, 112-2, 112-3, . . . configuring a plurality of subpixels and a plurality of LED driving circuits 121, 122, 123, . . . may be arranged. A specific configuration and operation of the substrate 100 is described in greater detail below with reference to FIG. 2.

The driving part 200 may input various signals into the plurality of LED driving circuits 121, 122, 123, . . . included in the substrate 100. The driving part 200 may include memory 210 and a processor (e.g., including processing circuitry) 220. While it is illustrated in an example that a substrate and a driving part are separated but the driving part 200 may be also arranged on the substrate 100.

The memory 210 may store an abnormal pixel area and LED arrangement information of the abnormal pixel area. The abnormal pixel area may include position information of a pixel on which LED elements are arranged in a different order from a preset LED color position. For example, the abnormal pixel area may be a position value (or a pixel value) of a pixel in which a position of a light emitting element is changed due to abnormality occurrence in a process described in greater detail below. Further, the LED arrangement information may be information of an LED order and may be information of exchanged LED elements in the relevant abnormal pixel. For example, arrangement information may be a value such as RBG and may be also BG (exchanged two color values).

Further, the memory 210 may store a preset (e.g., specified) LED color position. The color position as above may be information of the LED order in a normal pixel rather than an abnormal pixel. The LED color position as above is for confirming a LED order of the abnormal pixel area and a difference of the LED order of the abnormal pixel area, wherein if the LED arrangement information of the abnormal pixel area stores information of the exchanged LED elements, the preset LED color position may not be separately stored.

The memory 210 may store a lookup table. The lookup table may be a table having information about a degree of correction with respect to a pixel in which abnormality occurs. For example, when there is abnormality in one subpixel among three subpixels, if the relevant pixel operates only with the other subpixels, luminance displayed in real may be lower than a luminance value of an image. Therefore, the lookup table may store information about the extent of compensation to compensate for the difference in luminance. If luminance values of the other subpixels which normally operates are excessively increased to meet the luminance value, visibility of color distortion may rather increase because the relevant pixel outputs a color value in which one color is not emitted. Therefore, the lookup table may be generated using experimental data which may compensate for the luminance value while visibility of color distortion does not increase.

This memory 210 may be implemented in various forms such as RAM or flash memory, a HDD, external memory, and a memory card, wherein it is not limited to any one of them.

The processor 220 may include various processing circuitry and control the LED driving circuit to provide a signal corresponding to gradation information corresponding to the plurality of light emitting elements based the preset LED color position. For example, the processor 220 may generate a PWM signal corresponding to each color value of a specific pixel and then the processor, with respect to a normal pixel, may correspondingly transmit each PWM signal to the preset LED color position and with respect to an abnormal pixel, may transmit each PWM signal to the LED driving circuit corresponding to the LED arrangement information corresponding to the relevant pixel. The processor 220 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

For example, with respect to the normal pixel, the processor may generate a PWM signal corresponding to an R luminance value and provide the generated PWM signal to the LED driving circuit driving a light emitting element of an R color. Further, the aforementioned operations may be identically performed with respect to a B luminance value and a G luminance value. Meanwhile, with respect to the abnormal pixel where positions of a B color LED and a G color LED are exchanged, regarding an R luminance value, the processor may provide a PWM signal corresponding to an R color to the LED driving circuit corresponding to the R color in the same form as that of the normal pixel. However, regarding a B luminance value, the processor may generate a PWM signal corresponding to the relevant luminance value, provide the generated PWM signal to a LED driving circuit that drives a light emitting element of a G color, and provide a PWM signal with respect to the G luminance value to the LED driving circuit that drives a light emitting element of a B color.

While it is described that signal values of the abnormal pixel are exchanged (or swapped) in a process of providing the generated PWM signal to the LED driving circuit as above but upon implementing, the aforementioned operations may be performed before generating the PWM signal.

For example, the processor may perform the operations of generating a PWM signal and providing the generated PWM signal and may replace (or correct) a color value with respect to the abnormal pixel (or a luminance value per subpixel) according to a previously changed LED order.

For example, the processor 220 may replace luminance information with respect to each of the plurality of subpixels within the abnormal pixel area based on the preset LED arrangement position and the LED arrangement information of the abnormal pixel area. For example, the processor 220, if the LED arrangement information of the abnormal pixel area is different from the preset LED arrangement position in a G color and a B color, may exchange a luminance value of the G color within the abnormal pixel and a luminance value of the B color within the abnormal pixel in a present frame. For example, if an original color value of the abnormal pixel is (20, 168, 30) (RGB) and LEDs of G and B colors are exchanged, a color value of the relevant abnormal pixel may be replaced with (20, 30, 168).

Otherwise, the processor 220, if the LED arrangement information of the abnormal pixel area is different from the preset LED arrangement position in a R color and a B color, may exchange a luminance value of the R color within the abnormal pixel and a luminance value of the B color within the abnormal pixel in a present frame. For example, if an original color value of the abnormal pixel is (20, 168, 30) (RGB) and LEDs of R and B colors are exchanged, a color value of the relevant abnormal pixel may be replaced with (30, 168, 20).

With respect to the aforementioned abnormal pixel, the processor 220 may compensate for gradation information of the subpixel which normally operates within the abnormal pixel using the lookup table and may replace its luminance value with a luminance value corresponding to the compensated gradation information.

The processor 220 may provide the generated PWM signal to the LED driving circuit.

The driving part 200 may further include a timing controller, a data driving part, a gate driving part, or the like (not shown) in addition to the memory 210 and the processor 220.

The timing controller may receive an Input Signal IS, a Horizontal sync signal Hsync, a Vertical sync signal Vsync, a Main Clock Signal MCLK, or the like from an outside and may generate and provide an image data signal, a scanning control signal, a data control signal, an emission control signal, or the like to the substrate 100, the data driving part, the gate driving part, etc.

For example, the timing controller may apply at least one of various signals (Emi, Vsweep, Vini, VST, Test/Discharging) to a plurality of LED driving circuits 121, 122, 123, . . . . The timing controller may apply a control signal (MUX Sel R, G, B) for selecting one subpixel among R, G, B subpixels to the plurality of LED driving circuits 121, 122, 123, . . . .

The data driving part (or a source driver, a data driver) is a means (e.g., circuitry) for generating a data signal, wherein it may receive image data of R/G/B components, or the like and generate a data voltage (e.g. a PWM data voltage, a PAM data voltage).

The processor 220 may function as a data driving part or may perform a function of directly correcting the data voltage generated by the data driving part based on gradation information as a separate component from the data driving part.

For example, to perform a function according to the disclosure, it is possible to implement a processor by combining a general data driving part with the processor according to the disclosure or implement a processor such that the processor may additionally perform the function of the existing data driving part. In case of implementing in a first form, the processor 220 may replace a PWM signal of the abnormal pixel among the PWM signals generated by the data driving part to correspond to the changed LED color value of the relevant abnormal pixel and provide the replaced PWM signal to the LED driving circuit.

In case of implementing in a second form, the processor 220 may receive image data of R/G/B components, or the like, replace data of R/G/B components of the abnormal element to correspond to a LED color value of the relevant abnormal element, and generate a PWM signal using the data where the relevant processing is performed and provide the generated PWM signal to the LED driving circuit.

The gate driving part (or a gate driver) may be a means (e.g., including circuitry) for generating various control signals such as a control signal SPWM (n) and a control signal SPAM. The gate driving part may input the generated various control signals into the LED driving circuits corresponding to a specific row (or a specific horizontal line) among a plurality of pixels on the substrate 100 but the disclosure is not limited thereto.

The gate driving part may apply a driving voltage VDD to a driving voltage terminal of the LED driving circuit according to an embodiment.

All or part of the data driving part and the gate driving part may be implemented to be included in a Thin Film Transistor TFT layer formed on one side of glass of the substrate 100 or may be implemented as a separate semiconductor IC and be disposed on the other side of the glass.

According to an embodiment of the disclosure, a display wall including the aforementioned display panel in plural numbers may be also implemented. The design may be made such that on the display wall, a light emitting section per group of the LED driving circuits included in one display panel is not overlapped with a light emitting section per group of the LED driving circuits included in another display panel, respectively.

For example, it may be assumed that a first display panel drives light emitting elements of a first group and a second group according to their group and a second display panel drives light emitting elements of a third group and a fourth group according to their group.

In this case, a light emitting section of the third group included in the second display panel may start after a light emitting section of the first group included in the first display panel ends. A light emitting section of the second group included in the first display panel may start after a light emitting section of the third group included in the second display panel ends. A light emitting section of the fourth group included in the second display panel may start after a light emitting section of the second group included in the first display panel ends.

As above, the display device 1000 according to the disclosure, even if color arrangement of a specific pixel is different from color arrangement of a different pixel, may perform an image display operation corresponding to the changed color arrangement. For example, if a subpixel where visibility of color distortion is high due to abnormality in a circuit within the specific pixel may not normally operate, the subpixel may operate by exchanging positions of the subpixel where visibility is high and a subpixel where visibility is low, thereby lowering visibility of color distortion.

To facilitate the description of FIG. 1, it is described that there is abnormality only in one pixel but an abnormal pixel may be in plural numbers, wherein the aforementioned operations may be applied to each of the plurality of abnormal pixels. The LED replacement may be made such that the G color normally operates in a first priority in a criterion of a color ratio of BT709 but if an application environment of the display device has a different color ratio from the aforementioned color ratio, the LED replacement may be made such that a color which has the highest color ratio normally operates in a first priority based on the color ratio of the application environment.

Figure 2:
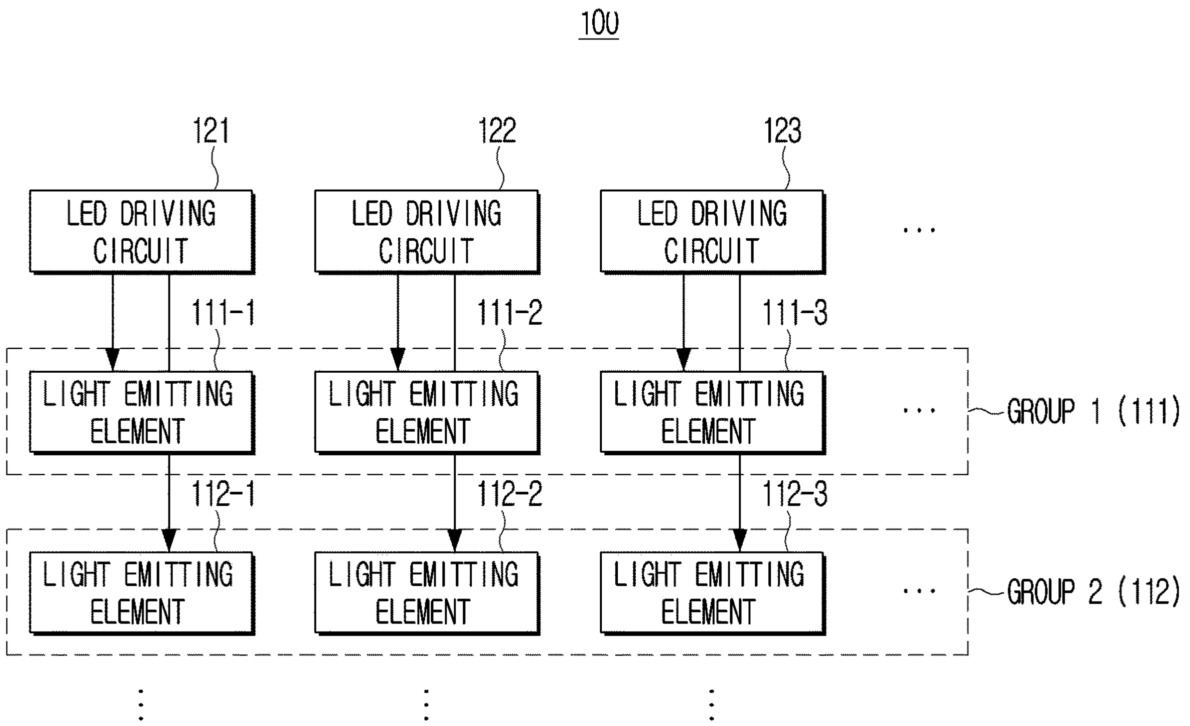
FIG. 2 is a block diagram illustrating an example configuration of a portion of a display panel according to various embodiments.

FIG. 2 is a block diagram illustrating an example configuration of a portion of a display panel according to various embodiments.

With reference to FIG. 2, on a light emitting element-based substrate 100, a plurality of light emitting elements 111-1, 111-2, 111-3, . . . , 112-1, 112-2, 112-3, . . . configuring a plurality of subpixels and a plurality of LED driving circuits 121, 122, 123, . . . may be arranged.

Each of the plurality of LED driving circuits are circuits for driving one or more light emitting elements. The plurality of LED driving circuits may be included in a circuit layer (e.g. a Thin Film Transistor TFT) formed on the substrate of the display panel. In this case, the substrate may be implemented as, for example, glass.

Each of light emitting elements may be an inorganic light emitting element configuring one subpixel.

For example, if the light emitting element is configured as a micro LED, the light emitting element may configure a subpixel outputting any one light among Red, Green, and Blue. In this case, the light emitting elements corresponding to each of Red, Green, and Blue may configure one pixel. For example, one pixel may be configured of a Red micro LED outputting Red color light, a Green micro LED outputting Green color light, and a Blue micro LED outputting Blue color light.

The substrate 100 includes a plurality of pixels and the plurality of pixels may be arranged in a matrix form on the substrate 100. The number of pixels may be determined according to resolution. For example, a display panel of a display device displaying in 8K resolution of a ratio of 16:9 is configured of 7680×4320 pixels, wherein in the case of an inorganic light emitting element, one pixel is configured of three LEDs and thus 7680×4320×3 LEDs are needed.

With reference to FIG. 2, the plurality of light emitting elements may be divided into a plurality of groups 111, 112, . . . . Light emitting elements configuring pixels positioned at the same row among a plurality of pixels arranged in a matrix form may be classified as the same group. Light emitting elements configuring pixels positioned in a checkerboard form among a plurality of pixels arranged in a matrix form may be classified as the same group.

A plurality of LED driving circuits 121, 122, 123, . . . may receive a PWM data voltage in a scanning section.

Further, the plurality of LED driving circuits 121, 122, 123, . . . may provide a driving current to the plurality of light emitting elements during time corresponding to the inputted PWM data voltage in the light emitting section, thereby driving the plurality of light emitting elements.

With reference to FIG. 2, each of the plurality of LED driving circuits may be connected to light emitting elements included in different groups among a plurality of groups. Further, each of the plurality of LED driving circuits may drive the connected light emitting elements according to their group.

For example, the plurality of LED driving circuits may segment and drive the plurality of groups by driving light emitting elements included in each of the plurality of groups through a scanning section and a light emitting section with respect to each of the plurality of groups.

The plurality of LED driving circuits may time-division drive the plurality of groups. That is, each of light emitting sections where each of the plurality of groups is driven may be classified.

A LED driving circuit 121 may be connected to a light emitting element 111-1 included in group 1 (111) and a light emitting element 112-1 which belongs to the group 2 (112), respectively. It is not shown in FIG. 2 but the LED driving circuit 121 may be connected to each of light emitting elements which belong to group 3, group 4, etc. Here, the LED driving circuit 121 may sequentially (time-division) drive each of the light emitting element 111-1 and the light emitting element 112-1.

The LED driving circuit 122 may be also connected to each of a light emitting element 111-2 included in the group 1 (111) and a light emitting element 112-2 which belongs to the group 2 (112). Further, the LED driving circuit 122 may classify and drive each of the light emitting element 111-2 and the light emitting element 112-2.

While the LED driving circuit 121 drives the light emitting element 111-1 included in the group 1 (111), the LED driving circuit 122 may also drive the light emitting element 111-2 included in the group 1 (111).

While the LED driving circuit 121 drives the light emitting element 112-1 included in the group 2 (112), the LED driving circuit 122 may also drive the light emitting element 112-2 included in the group 2 (112).

The LED driving circuit and the plurality of light emitting elements are connected in a pattern on the substrate as above, wherein an electric connection between the LED driving circuit and a specific light emitting element may be shut or opened due to abnormality in a manufacturing process, abnormality in an assembling process, or the like. As above, if there is a problem of wiring, there may be an abnormal operation that a specific LED connected to the relevant wiring is off or is excessively bright.

If the specific LED is off, visibility of color distortion resulting from the abnormality may be lowered by exchanging positions of LED elements within the relevant pixel and replacing a signal value of the relevant pixel value as aforementioned.

However, in case that wiring connected to the specific LED is opened and the LED is excessively bright, if the exchange of the LED elements is performed as aforementioned, an abnormal operation may proceed such that a light emitting element newly disposed at the relevant abnormal position also operates excessively bright.

Therefore, if wiring connected to the specific LED is opened and the LED is excessively bright as aforementioned, the LED may not be disposed on the relevant subpixel area. For example, in a normal pixel, the light emitting elements may be arranged in a RGB order and in an abnormal pixel where there is abnormality in a position corresponding to a G area, may be arranged in a R×G form. As above, even if the LED element is not positioned in the relevant pixel, operations of the processor may be performed in the same method as previously described.

Figure 3:
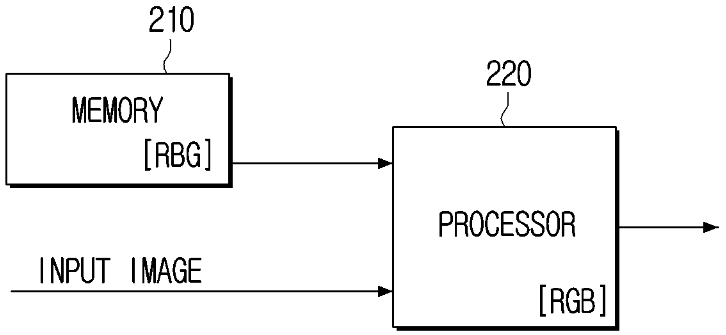
FIG. 3 is a block diagram illustrating an example configuration of a driving part of FIG. 1 according to various embodiments.

FIG. 3 is a block diagram illustrating an example configuration of the driving part of FIG. 1 according to various embodiments.

With reference to FIG. 3, a driving part 200 may include memory 210 and a processor (e.g., including processing circuitry) 220.

The memory 210 may store an abnormal pixel area and LED arrangement information of the abnormal pixel area. Further, the memory 210 may store a lookup table to compensate for a luminance value applied to an abnormal pixel, or the like.

The processor 220 may include various processing circuitry and generate a PWM signal using an input image corresponding to a present frame. With respect to a normal pixel, the processor 220 may generate a signal corresponding to gradation information corresponding to each of a plurality of light emitting elements based on a preset LED color position, wherein with respect to an abnormal pixel, the processor may generate a signal based on LED arrangement information corresponding to the relevant abnormal pixel. The description of the processor 220 provided above with reference to FIG. 1 applies equally here and therefore, a repeated description is not provided here.

For the operation as above, the processor 220 may replace a color value corresponding to an abnormal pixel (or a luminance value per subpixel) within an input image to correspond to the LED arrangement information of the abnormal pixel area. Otherwise, in an output stage of the PWM signal rather than an image correction stage, the PWM signal with respect to the abnormal pixel may correspond to LED arrangement within the relevant abnormal pixel, wherein output targets may be swapped.

The processor 220 may perform correction to compensate for a luminance value with respect to a pixel where abnormality occurs. Correction as above may be performed using a calculation method or using a lookup table.

Figure 4:
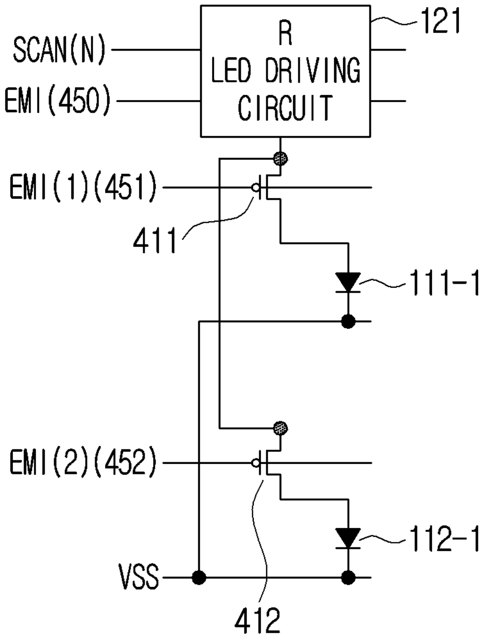
FIG. 4 is a circuit diagram illustrating an example connection relation between a LED driving circuit and light emitting elements included in the display panel according to various embodiments.

FIG. 4 is a circuit diagram illustrating an example connection relation between a LED driving circuit and light emitting elements included in the display panel according to various embodiments.

For example, FIG. 4 illustrates that the LED driving circuit 121 is connected to each of light emitting elements 111-1, 112-1 configuring red subpixels included in each of two different pixels.

With reference to FIG. 4, the LED driving circuit 121 may be connected to a first transistor 411 that is included in the group 1 (111) and is connected to a light emitting element 111-1 driven by the LED driving circuit 121, a second transistor 412 that is included in the group 2 (112) and is connected to the light emitting element 112-1 driven by the LED driving circuit 121, or like.

The LED driving circuit 121 may apply currents to the first transistor 411 or the second transistor 412 according to a common control signal, e.g., Emi (450).

For example, the LED driving circuit 121 may apply currents to the first transistor 411 or the second transistor 412 during a light emitting section in which the common control signal EMI 450 is applied.

The first transistor 411 may be switched according to a first control signal Emi (1) 451 and the second transistor 412 may be switched according to a second control signal Emi (2) 452. The first control signal Emi (1) 451 may turn on the first transistor 411 during a light emitting section 461 with respect to the group 1 (111) to apply currents from the LED driving circuit 121 to the light emitting element 111-1. The second control signal EMI (2) 452 may turn on the second transistor 412 during a light emitting section 462 with respect to the group 2 (112) to apply currents from the LED driving circuit 121 to the light emitting element 112-1.

The LED driving circuit 121 may provide a driving current to the light emitting element 111-1 included in the group 1 (111) through the first transistor 411 turned on according to the first control signal Emi (1) during the light emitting section 461 with respect to the group 1 (111) based on a first PWM data voltage inputted from the scanning section with respect to the group 1 (111).

The LED driving circuit 121 may provide a driving current to the light emitting element 112-1 included in the group 2 (112) through the second transistor 412 turned on according to the second control signal Emi (2) during the light emitting section 462 with respect to the group 2 (112) based on a second PWM data voltage inputted from the scanning section with respect to the group 2 (112).

The connection relation between the LED driving circuit and the light emitting elements is also commonly applied to a connection relation between a plurality of light emitting elements as shown, for example, in FIG. 1 or FIG. 2, wherein upon driving, the plurality of light emitting elements may be driven in a group unit.

In the connected state as above, if there is abnormality in the second transistor 412 or there is a problem in wiring between the LED driving circuit 121 and the second transistor 412, the light emitting element 112-1 may not perform a normal light emitting operation.

As above, if there is the problem in the transistor connected to the light emitting element or wiring between the transistor and the driving circuit, the relevant problem may not be addressed by replacing the light emitting element of the subpixel which operates abnormally.

If a color of the subpixel where abnormality occurs is a G color, visibility of color distortion is high while the display device operates. For example, this is because the G color corresponds to a color value having a color ratio of 70% or more in BT709. Therefore, there is a need for a method for lowering visibility of color distortion when the abnormality occurs and hereinafter, the method is described in consideration of a pixel arrangement state.

Figure 5:
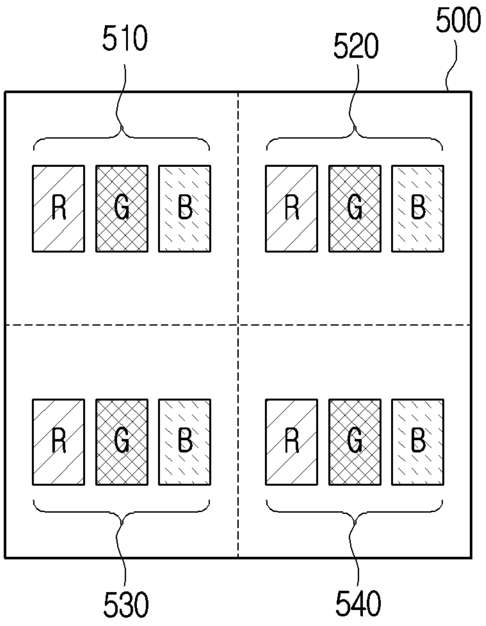
FIG. 5 is a diagram illustrating an example of a plurality of light emitting elements arranged according to a preset LED color position according to various embodiments.

FIG. 5 is a diagram 500 illustrating an example in which a plurality of light emitting elements are arranged according to a preset LED color position according to various embodiments.

With reference to FIG. 5, four pixels 510, 520, 530, 540 of the display device are shown. Each pixel may be configured of three subpixels, wherein an R color light emitting element, a G color light emitting element, and a B color light emitting element are arranged at the same LED color position as shown. It is illustrated in the shown example that light emitting elements are arranged in a RGB order but upon implementing, the light emitting elements may be also arranged in an order such as RBG, GRB, GBR, BRG, or BGB.

It is illustrated in the example that each pixel is configured of three subpixels but upon implementing, each pixel may be configured of four subpixels. For example, a white LED may be additionally used besides the RGB.

As previously shown in FIG. 4, the light emitting element of the same color is driven using the same LED driving circuit. In this regard, it may be preferable that the LEDs be arranged at the same color position of each pixel as shown in FIG. 5 for wiring between the LED driving circuit and the plurality of LED elements.

However, there be an abnormal operation that the LED of the specific subpixel is off or is excessively bright and in this case, color distortion may occur. If abnormality as above is abnormality of the specific LED itself, the abnormality operation may be corrected by replacing the relevant LED.

However, if the LED of the specific subpixel abnormally operates due to abnormality in the circuit within the substrate, there is a need for reducing occurrence of the color distortion. In the case of the micro LED, the display device is configured by combining various LED modules. In this regard, it is possible to remove an error by replacing the LED module where the error occurs. However, regarding the recent micro LED, about 40,000 LEDs are arranged on one module. In this regard, it may be unnecessary resource waste to waste the LED module for the reason of abnormality only in one subpixel.

Therefore, an aspect of the disclosure is to reduce color distortion by changing a LED arrangement order of the pixel where there is abnormality without replacing the substrate in a circumstance as above.

Figure 6:
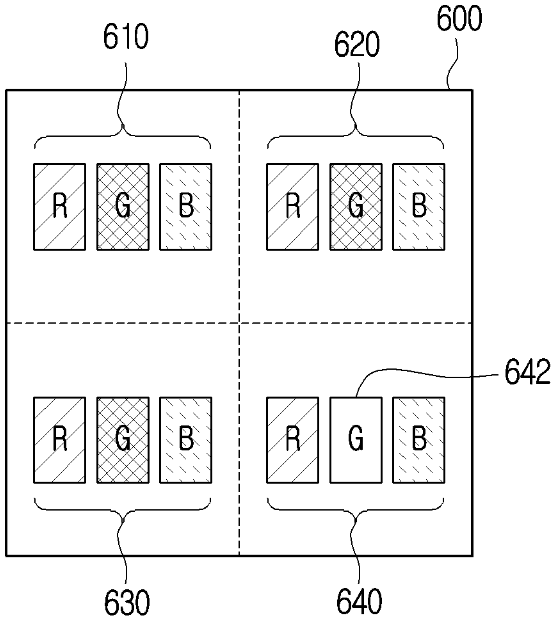
FIG. 6 is a diagram illustrating an abnormal pixel area according to various embodiments.

FIG. 6 is a diagram 600 illustrating an example abnormal pixel area according to various embodiments.

With reference to FIG. 6, four pixels 610, 620, 630, 640 of the display device are shown. Hereinafter, the description is made under the assumption that there is abnormality in the circuit area of the G color 642 of the fourth pixel 640 among the pixels.

If a position of abnormality within a defective pixel where abnormality occurs relates to the G color, visibility of color distortion is very high because the G color has a high color ratio as previously described. Specifically, a color ratio of RGB in BT709 has a ratio of 21.3%/71.5%/7.2%, wherein the G color has a high ratio of about 70% or more. In this regard, if there is abnormality in the G color, visibility of color distortion is very high.

If the abnormality results from a problem of a light emitting element of the relevant area, the color distortion may be resolved by replacing the light emitting element with a normally operating light emitting element. However, if there is abnormality in an operation of the G color because of abnormality in the circuit within the substrate (abnormality in the transistor or a short circuit in wiring, etc.), or the like rather than the problem of the light emitting element, the problem may be addressed only by replacing the substrate.

However, the LED module may include tens of thousands of light emitting elements as previously described. In this regard, it is not environmentally or economically preferable to replace the LED module for the reason of abnormality in part of the subpixels.

Therefore, the LED color arrangement is changed within the abnormal pixel through the LED rearrangement in the disclosure. Specifically, in regard that abnormality occurs with respect to the G color area but there is no abnormality in the R and B color areas, it is possible to replace the G color area with the R or B color area. As B has the lowest ratio in the color ratio of BT709 as described above, the G color and the B color may be exchanged.

An example in which there is abnormality in the G color area is described but even in the case that there is abnormality in the R color area, visibility of color distortion may be lowered in a way that the R color and the B color are exchanged and then only B having the lowest color ratio does not operate as aforementioned.

Further, if there is abnormality only in the B color area, to replace the relevant B color with the G or R color increases visibility of color distortion as previously described. Therefore, if there is abnormality in the B color area, the replacement may not be performed.

Where there is abnormality with respect to one color area is described above but the aforementioned operations may be also performed in the case that there is abnormality with respect to two color areas within one pixel. For example, if only the R color normally operates and the B and G colors abnormally operate or if only the B color normally operates and the R and G colors abnormally operate, the replacement that the light emitting element of the G color is disposed on the normally operating area may be performed. Also, in this case, if only the G color are normally operates and the R and B colors abnormally operate, the replacement of colors increases visibility of color distortion and thus the replacement of colors may not be performed.

Figure 7:
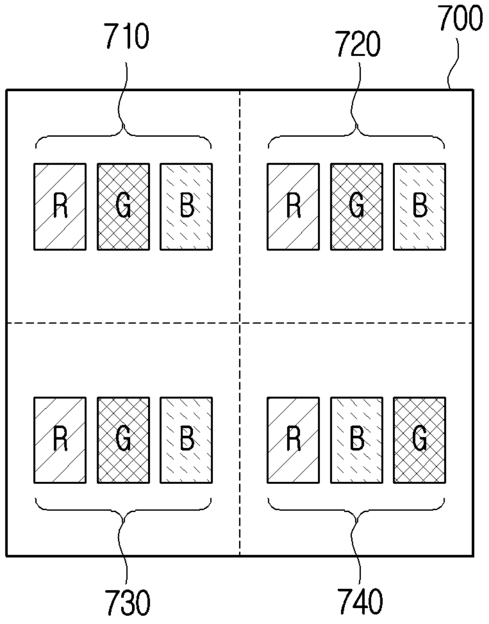
FIG. 7 is a diagram illustrating an example of an abnormal pixel area and a LED arrangement in the relevant abnormal pixel area according to various embodiments.

As above, an arranged form of the case that the replacement of colors is performed is illustrated in FIG. 7.

FIG. 7 is a diagram 700 illustrating an example of an abnormal pixel area and a LED arrangement in the relevant abnormal pixel area according to various embodiments.

With reference to FIG. 7, four pixels 710, 720, 730, 740 of the display device are shown. Three pixels 710, 720, 730 among them are normal areas but one pixel 740 is an abnormal pixel (or a defective pixel).

As above, the abnormal pixel 740 has a different LED color position from that of the other pixels in order to lower visibility of color distortion as previously described. For example, light emitting elements are arranged in a RGB order in the normal pixels but light emitting elements are arranged in a RBG order in the abnormal pixel 740.

As previously described, a second area of the relevant pixel 740 is an area where a light emitting element does not normally operate due to abnormality in the circuit and thus only light emitting elements arranged on a first area and a third area normally operate in the abnormal pixel 740.

Even though positions of the light emitting element of the B color and the light emitting element of the G color are exchanged in the abnormal pixel as above, the display device may not normally operate. For example, this is because the G light emitting element is driven based on a brightness value (or a PWM value) corresponding to the B color value of the relevant pixel since the G light emitting element is currently connected to the LED driving circuit which drives B light emitting elements.

Therefore, when the LED element of the pixel where there is an abnormal pixel is replaced, its signal value may be replaced with a signal value corresponding to the changed element position with respect to the relevant pixel. Further, this replacement may be performed only when the target to be replaced is known and thus there is a need to store information about the abnormal pixel and LED arrangement information of the relevant abnormal pixel in the memory.

If an image value (or a RGB value) with respect to the relevant pixel is inputted, the image value may be used in a way of exchanging a signal of a G value and a signal of a B value using the LED arrangement information. For example, a luminance value of the G value may be provided to the LED driving circuit which drives the B color and a luminance value of the B value may be provided to the LED driving circuit which drives the G color.

As above, an operation of the display to which a swap of signal values is applied is described with reference to FIG. 8.

Figure 8:
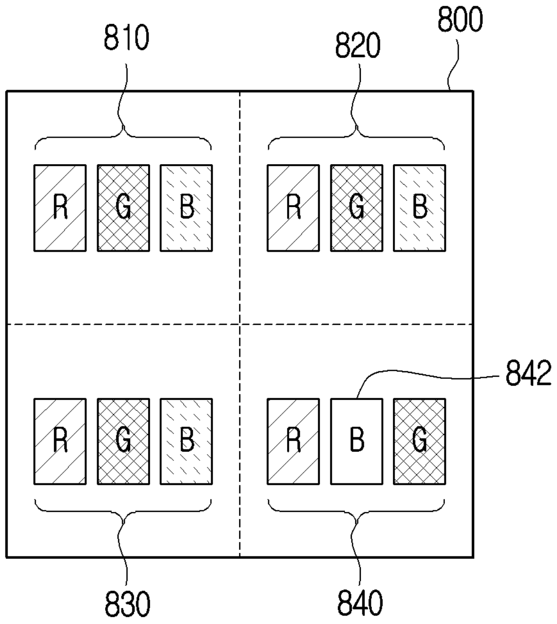
FIG. 8 is a diagram illustrating an example operation of the arrangement example in FIG. 7 according to various embodiments.

FIG. 8 is a diagram 800 illustrating an example operation of the arrangement example in FIG. 7 according to various embodiments.

With reference to FIG. 8, four pixels 810, 820, 830, 840 of the display device are shown. Three pixels 810, 820, 830 among them are normal areas but one pixel 840 is an abnormal pixel (or a defective pixel).

In the abnormal pixel 840, light emitting elements of the B color and the G color are replaced to lower visibility of color distortion, wherein it is different from other pixels. Further, the G pixel value is transmitted to the B color area and the driving signal PWM corresponding thereto is inputted in the signal processing process, wherein the LED element of the G color may perform light emitting corresponding to the G pixel value.

As above, one subpixel among three subpixels of the abnormal pixel 840 does not operate. However, a normal operation is not performed only in the B color having the lowest color ratio in BT709 and a normal operation is performed in the G and R colors having a ratio of about 92.8%, thereby significantly lowering visibility of color distortion.

An operation of the disclosure is described under the assumption that there is abnormality in the G color area in FIGS. 6 to 8 but it may be also applied to the case that there is abnormality in the R color area as previously described and the aforementioned method may be also applied to the case that there is abnormality in the G and R colors or there is abnormality in the G and B colors.

Even if one pixel is not configured of three subpixels but is configured of four subpixels, visibility of color distortion may be lowered by exchanging light emitting elements of the subpixel where there is an error and the subpixel having a relatively low color ratio based on the color ratio in BT709 as previously described. Also, the replacement may be performed based on the color ratio most often used in the relevant display device rather than the aforementioned BT709.

The replacement of colors as above may be performed at a time point of initially launching a product and may be performed in an AS process in which an error of the substrate is confirmed after the launch of the product.

Figure 9:
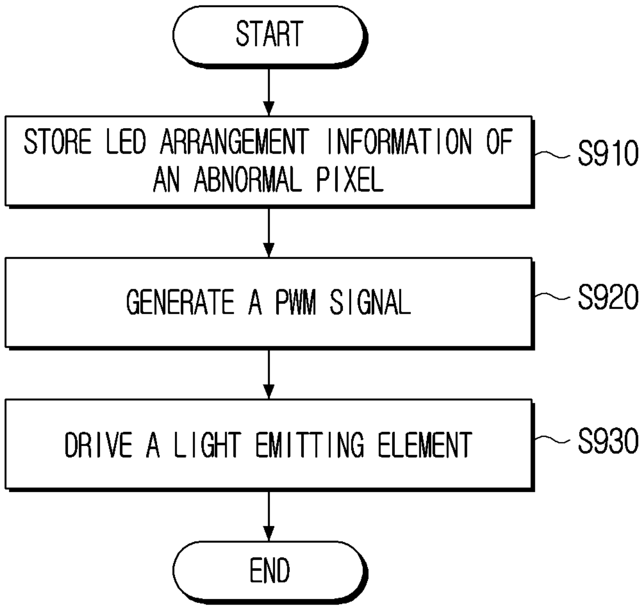
FIG. 9 is a flowchart illustrating an example method of operating a display device according to various embodiments.

FIG. 9 is a flowchart illustrating an example method of operating a display device according to various embodiments.

With reference to FIG. 9, first, the method includes storing an abnormal pixel area and LED arrangement information of the abnormal pixel area (S910).

Further, the method includes generating a PWM signal for driving a plurality of light emitting elements (S920). For example, the method includes generating a PWM signal corresponding to the LED arrangement information of the abnormal pixel area instead of a preset LED color position with respect to the plurality of light emitting elements within the abnormal pixel area. For example, the method includes if the LED arrangement information of the abnormal pixel area is different from the preset LED arrangement position in a G color and a B color, exchanging a luminance value of the G color within the abnormal pixel and a luminance value of the B color within the abnormal pixel in a present frame. Alternatively, the method includes if the LED arrangement information of the abnormal pixel area is different from the preset LED arrangement position in an R color and a B color, exchanging a luminance value of the R color within the abnormal pixel and a luminance value of the B color within the abnormal pixel in a present frame.

The method includes driving a plurality of light emitting elements using the generated PWM signal (S930).

The method described with reference to FIG. 9 may be performed in the display device of FIG. 1.

Each of the components according to various embodiments above may be configured as a single item or a plurality of items, wherein a partial subcomponent of the aforementioned relevant subcomponents may be omitted or another subcomponent may be further included in various embodiments. Mostly or additionally, some components may be integrated into one item and may identically or similarly perform a function implemented by each of the relevant components before the integration.

According to various embodiments above, operations performed by a module, a program, or another component may be executed sequentially, in parallel, repetitively, or heuristically, at least part of the operations may be executed in different orders or be omitted, or another operation may be added thereto.

The description above illustrates various examples to describe the technical spirit of the disclosure, where those skilled in the art may make various corrections and modifications to the extent of not deviating from an essential characteristic of the disclosure. The various example embodiments according to the disclosure do not to limit the technical spirit of the disclosure but describe it, wherein the scope of the technical spirit of the disclosure is not limited by these embodiments. It will also be understood that any of the embodiment(s) described herein may be used in conjunction with any other embodiment(s) described herein.

What is claimed is:

1. A display device, comprising:

a substrate;

a plurality of pixels of a display panel arranged on the substrate and each pixel comprising a plurality of light emitting diode (LED) subpixels;

an LED driving circuit arranged on the substrate and configured to drive the plurality of pixels;

memory storing abnormal pixel information comprising LED arrangement information about respective arrangements of colors of the plurality of LED subpixels within abnormal pixels of the display panel, the respective arrangements of colors of the plurality of LED subpixels within abnormal pixels being different from a specified arrangement of colors of a plurality of LED subpixels within a normal pixel of the display panel; and at least one processor, comprising processing circuitry, configured, individually and/or collectively, to;

control the LED driving circuit to drive normal pixels of the display panel by providing a first signal corresponding to pixel driving information based on the specified LED color arrangement, control the LED driving circuit to drive a respective abnormal pixel of the display panel by providing a second signal corresponding to pixel driving information based on the LED arrangement information about the arrangement of colors of the plurality of LED subpixels of the respective abnormal pixel.

2. The display device of claim 1, wherein the plurality of subpixels within normal pixels comprises a first light emitter of a first color, a second light emitter of a second color different from the first color, and a third light emitter of a third color different from the first and second colors, the first, second, and third light emitters being arranged according to the specified arrangement of colors, and wherein the plurality of subpixels within abnormal pixels comprises light emitters arranged differently from the specified arrangement of colors.

3. The display device of claim 1, wherein each pixel includes three subpixels of different colors, wherein, based on one subpixel of being an abnormal subpixel, an abnormal pixel is configured as:

a light emitter of a G (green) color and a light emitter of an R (red) color arranged on two normal subpixels.

4. The display device of claim 3, wherein one of the light emitter of the G color or the light emitter of the R color within the abnormal pixel is disposed at a position corresponding to the specified LED color arrangement.

5. The display device of claim 1, wherein each pixel comprises three subpixels of different colors, wherein, based on two subpixels being abnormal subpixels, the abnormal pixel is configured as a light emitter of a G color being disposed on one normal subpixel.

6. The display device of claim 1, wherein at least one processor is configured, individually and/or collectively, to:

replace luminance information with respect to each of the plurality of subpixels within a respective abnormal pixel based on the specified LED arrangement and the LED arrangement information of the respective abnormal pixel.

7. The display device of claim 6, wherein at least one processor is configured, individually and/or collectively, to:

based on the LED arrangement of a respective abnormal pixel being different from the specified LED arrangement in a G color and a B (blue) color, exchange a luminance value of the G color within the respective abnormal pixel and a luminance value of the B color within the respective abnormal pixel in a present frame.

8. The display device of claim 6, wherein at least one processor is configured, individually and/or collectively, to:

based on the LED arrangement of a respective abnormal pixel being different from the specified LED arrangement in a R color and a B color, exchange a luminance value of the R color within the respective abnormal pixel and a luminance value of the B color within the respective abnormal pixel in a present frame.

9. A method of operating a display device including a plurality of pixels of a display panel and each pixel comprising a plurality of light emitting diode (LED) subpixels, the method comprising:

storing abnormal pixel information comprising LED arrangement information about respective arrangements of colors of the plurality of LED subpixels within abnormal pixels of the display panel, the respective arrangements of colors of the plurality of LED subpixels within abnormal pixels being different from a specified arrangement of colors of a plurality of LED subpixels within a normal pixel of the display panel;

generating a pulse-width modulation (PWM) signal for driving the plurality of pixels; and driving the plurality of pixels using the generated PWM signal, wherein the generating the PWM signal includes:

generating a PWM signal to drive a respective abnormal pixel of the display panel based on the LED arrangement information about the arrangement of colors of the plurality of LED subpixels within the respective abnormal pixel.

10. The method of claim 9, further comprising:

replacing luminance information with respect to each of the plurality of subpixels within a respective abnormal pixel based on a specified LED arrangement and the LED arrangement information of the respective abnormal pixel.

11. The method of claim 10, further comprising:

based on the LED arrangement of a respective abnormal pixel being different from the specified LED arrangement in a G (green) color and a B (blue) color, exchanging a luminance value of the G color within the respective abnormal pixel and a luminance value of the B color within the respective abnormal pixel in a present frame.

12. The method of claim 10, further comprising:

based on the LED arrangement of a respective abnormal pixel being different from the specified LED arrangement in a R (red) color and a B (blue) color, exchanging a luminance value of the R color within the respective abnormal pixel and a luminance value of the B color within the respective abnormal pixel in a present frame.

13. The display device of claim 1, wherein, based on the LED arrangement within a respective abnormal pixel being different from the specified LED color arrangement in two colors among R (red), G (green) and B (blue), exchange luminance information with respect to each of the plurality of subpixels of the two colors.

14. The method of claim 9, wherein, based on the LED arrangement within a respective abnormal pixel being different from the specified LED color arrangement in two colors among R (red), G (green) and B (blue), exchange luminance information with respect to each of the plurality of subpixels of the two colors.

15. A display device, comprising:

a substrate;

a plurality of pixels of a display panel arranged on the substrate and each pixel comprising a plurality of light emitting diode (LED) subpixels;

an LED driving circuit arranged on the substrate and configured to drive the plurality of pixels;

memory storing abnormal pixel information comprising LED arrangement information about respective arrangements of colors of the plurality of LED subpixels within abnormal pixels of the display panel, the respective arrangements of colors of the plurality of LED subpixels within abnormal pixels being different from a specified arrangement of colors of a plurality of LED subpixels within a normal pixel of the display panel; and at least one processor, comprising processing circuitry, configured, individually and/or collectively, to:

control the LED driving circuit to drive normal pixels of the display panel by providing first signals corresponding to pixel driving information for driving subpixels within the normal pixels based on color arrangement of the subpixels within the normal pixels being the specified color arrangement, control the LED driving circuit to drive a respective abnormal pixel of the display panel by providing second signals corresponding to pixel driving information for driving subpixels within the abnormal pixels based on color arrangement of the subpixels within the abnormal pixels being different the specified color arrangement.

* * * * *